US008675862B1

(12) United States Patent
Lin

(10) Patent No.: US 8,675,862 B1
(45) Date of Patent: Mar. 18, 2014

(54) METHOD AND APPARATUS OF A CERTAIN CELL PHONE CASE WITH A UNIVERSAL DECORATIVE PATTERN LAYER

(71) Applicant: Tso Wei Lin, Irwindale, CA (US)

(72) Inventor: Tso Wei Lin, Irwindale, CA (US)

( * ) Notice: Subject to any disclaimer, the term of this patent is extended or adjusted under 35 U.S.C. 154(b) by 0 days.

(21) Appl. No.: 13/657,046

(22) Filed: Oct. 22, 2012

(30) Foreign Application Priority Data

Aug. 22, 2012 (CN) .................. 2012 2 0420530 U

(51) Int. Cl.
H04M 1/00 (2006.01)
H04M 1/18 (2006.01)
H04M 1/11 (2006.01)
(52) U.S. Cl.
CPC ............... H04M 1/185 (2013.01); H04M 1/11 (2013.01)
USPC ......................... 379/451; 379/437; 455/575.8
(58) Field of Classification Search
USPC ............... 379/440, 437, 441, 451; 455/575.1, 455/575.8; 361/679.01, 679.3, 679.41, 361/679.56, 679.57; 206/308.3, 320, 701, 206/703, 722, 724
See application file for complete search history.

(56) References Cited

U.S. PATENT DOCUMENTS

| | | | |
|---|---|---|---|
| 2009/0314400 A1* | 12/2009 | Liu ............................... | 150/165 |
| 2010/0062816 A1* | 3/2010 | Yu ............................... | 455/575.8 |
| 2013/0257240 A1* | 10/2013 | Hong ......................... | 312/223.1 |

* cited by examiner

Primary Examiner — Tuan D Nguyen

(57) ABSTRACT

A protective case discloses an electronic device protective casing, comprising the main protective shell body and the universal decorative pattern layer, the said main protective shell body layer has a pattern opening corresponding to the pattern of the universal decorative pattern layer to snugly fit in, and the said decorative pattern layer disposed on the said protective shell body layer via fixed plate. And the said fixed plate area is greater than the said decorative pattern layer. Since the said universal decorative pattern layer and the said protective shell body are manufactured separately, the universal decorative plate will be able to use for different electronic devices, therefore it will reduce the cost to make such case in term of reproduction of molding, and thereby the cost of the electronic device protective case will be as well reduced.

8 Claims, 8 Drawing Sheets

METHOD AND APPARATUS OF A CERTAIN CELL PHONE CASE WITH A UNIVERSAL DECORATIVE PATTERN LAYER

FIELD OF THE INVENTION

The present invention relates to the accessories for electronic devices such as cell phones and more particularly a protective case for such devices.

BACKGROUND OF THE INVENTION

Electronic devices have become more and more popular among different age groups of consumers for the past decades and they will continue to be very popular for years to come. In the meantime, the evolution of their accessories is as well widely developed for the demands of the market. Electronic device or cell phone case of the prior art are basically designed to carry around the phones. There are cases with different designs and purposes. For example, there are cases designed for the look as well the functionality and protection. According the prior art of the case for the aesthetic aspect of it, it is either made with one or multiple layer(s) of material, either with or without decoration, all the layers are forming as one or multiple; however, the case fits only for one particular model. But, when there are newer devices, either an updated version or a brand new model, in order to protect the newest model or device, the manufacturers need to completely redesign the whole complete case for such device, which increases the cost of the production of such case. To the extent of the price and value—aesthetic and functionality, there is a need for such case with universal decorative pattern layer.

Thus, there is a need for an improved case for an electronic device such as cell phone or tablet that provides protection for the device with a fashionable look, with a universal decorative pattern layer.

SUMMARY

The following summary is provided to facilitate an understanding of some of the innovative features unique to the embodiments and is not intended to be a full description. A full description of the various aspects of the embodiments can be gained by taking the entire specification, claims, drawings and abstracts as a whole.

The present invention of the utility model is to overcome the flaw of the prior art, the method of production of a protective case that comprises two (2) separate layers, one protective shell layer and one universal decorative pattern layer. The present method of production is useful for majority of the cases, such as case for different models; the users can simply replace the protective shell layer according to the desired model and still continue using the same decorative pattern layer, therefore it reduces the consumer spending. Moreover, this method of production is useful for a case of an updated newer model, the manufacturer is simply reproduce the protective shell layer to the desired updated model, without remaking the molding of production for the decorative pattern layer, which mostly costs remarkably more, thus, the production of such case is simple and less expensive.

The present invention has been made to solve the foregoing problems. Therefore, it is an object of the present invention to provide the method of production of an electronic device case comprising a protective shell layer and a universal decorative pattern layer; where the universal decorative pattern layer is able to use to fit for various models or devices.

DRAWINGS

These and other features, aspects, and the advantages of the present invention will become better understood with reference to the accompanying drawings, descriptions and appended claims, where:

FIG. 1 is a perspective view of a protective case according to the present invention;

FIG. 2 is a perspective view showing the interior portion of the case of FIG. 1;

FIG. 3 is a perspective view showing the main protective shell layer part of a protective case according to the present invention;

FIG. 4 is a perspective view showing the interior portion of the main protective shell layer part of the case of FIG. 3;

FIG. 5 is a perspective view of the universal decorative pattern layer part of a protective case of the present invention;

FIG. 6 is a perspective view showing the rear portion of the universal decorative pattern layer part of FIG. 5;

FIG. 7 is sectional rear elevational view of the case of FIG. 1;

FIG. 8 is sectional elevational detail view on section A-A of FIG. 7.

DESCRIPTION OF THE PRESENT INVENTION

With reference to the drawings, the preferred embodiment of the protective case comprising a hard protective shell layer and a universal decorative pattern layer, according to the present invention is herein described.

Figure 1:
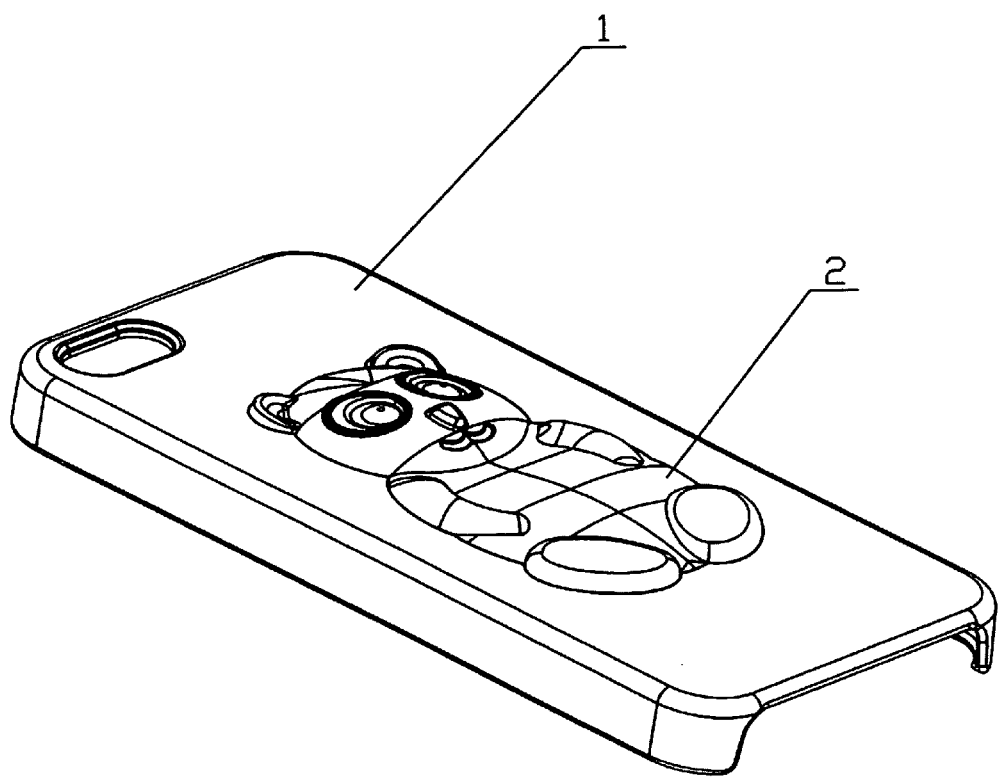
FIG. 1 to FIG. 8:
1. Protective case;
2. Pattern of the decorative pattern layer;
3. Pattern opening;
4. Fixed Plate;
5. Accommodating recess;
6. Male feature of the connectors;
7. Female feature of the connectors
8. Notch.
Figure 2:
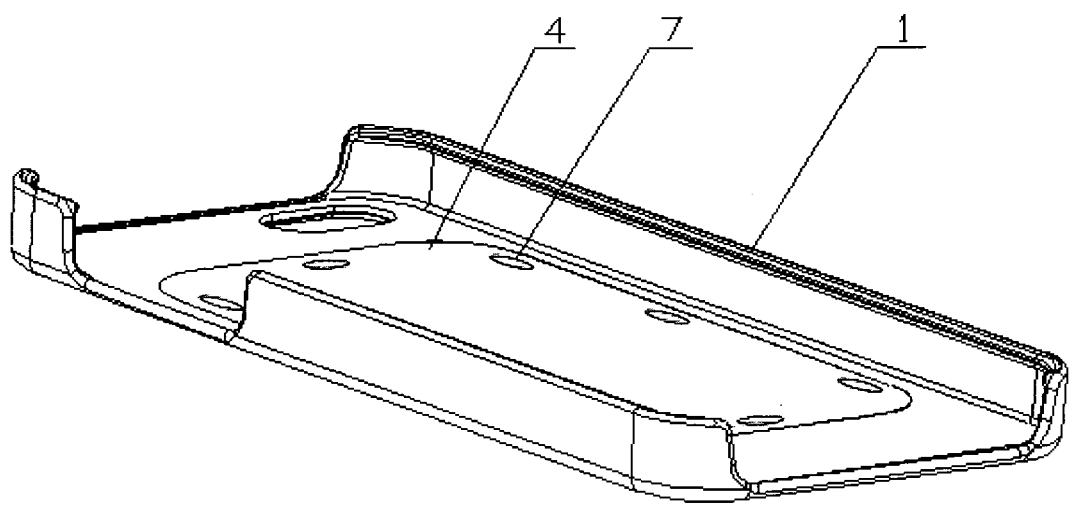

As shown in FIG. 1 and FIG. 2, according to certain embodiments of the present invention, the protective case consists of the main body part or the protective shell layer 1 and the decorative pattern layer 2.

Figure 3:
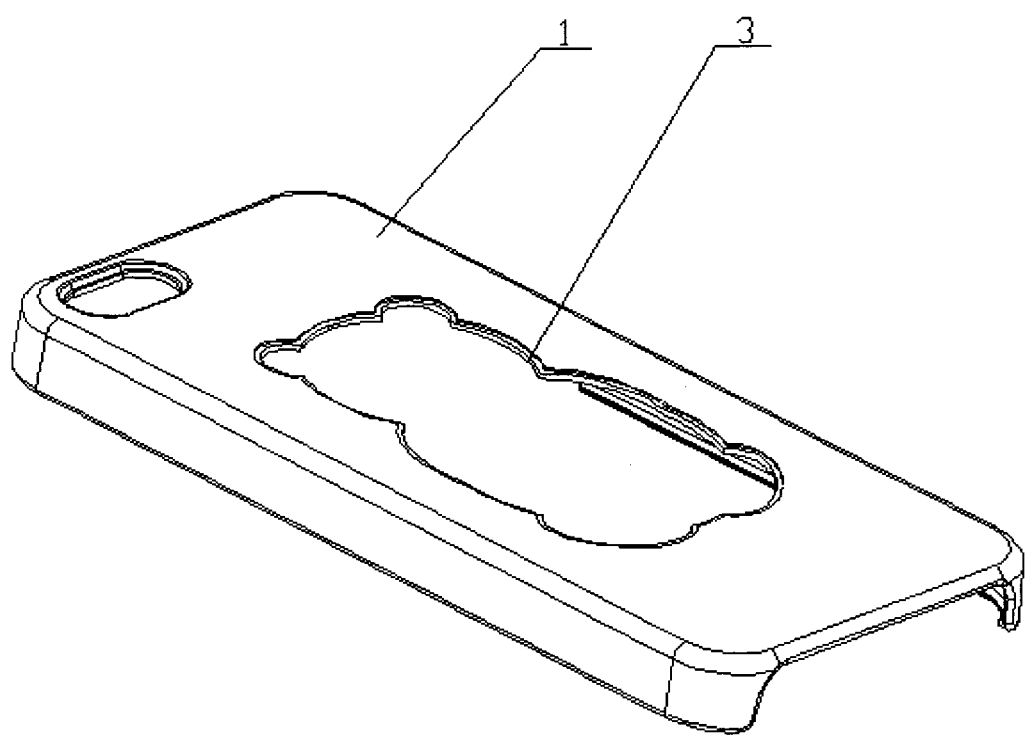
Figure 4:
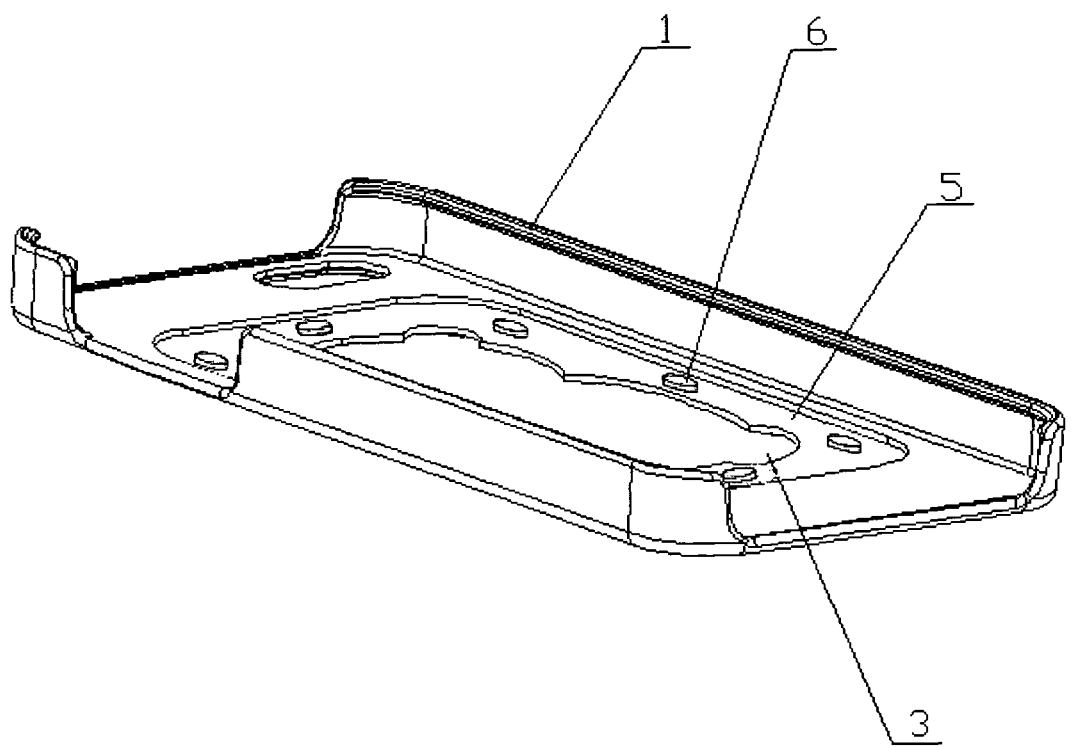

As shown in FIG. 3 and FIG. 4 of certain embodiments of the present invention, the main body part or the protective shell layer 1 is shown with a pattern opening 3.

Figure 5:
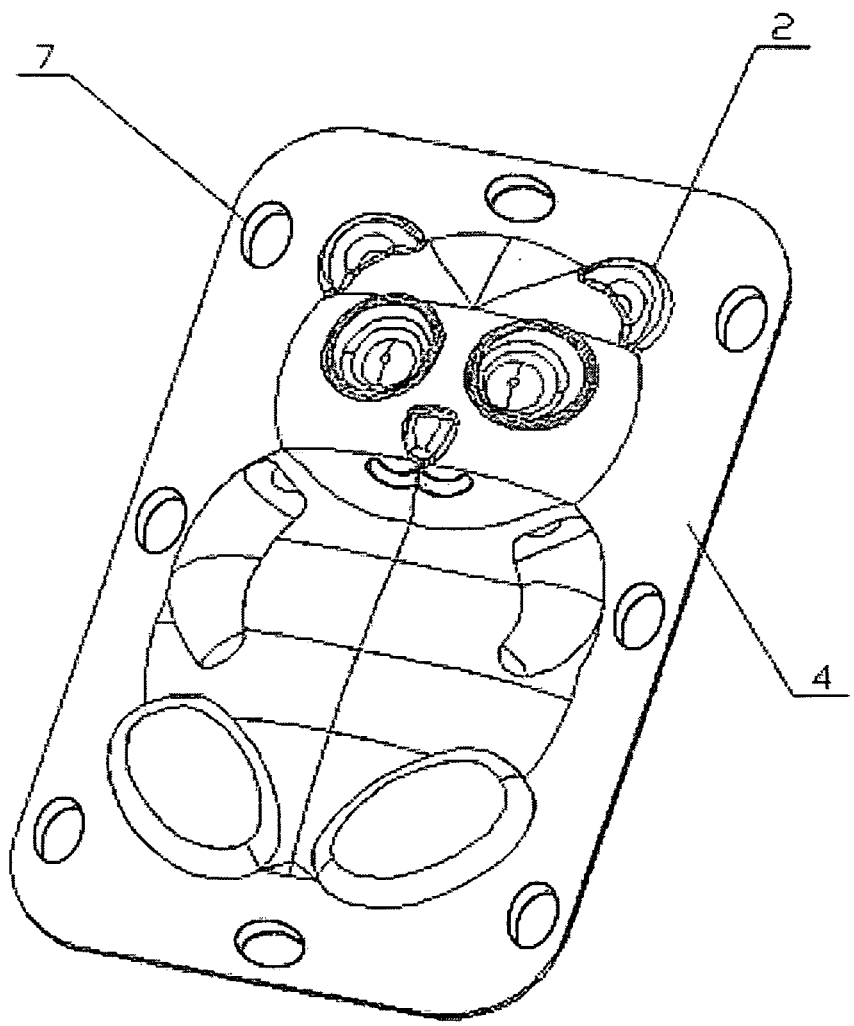
Figure 6:
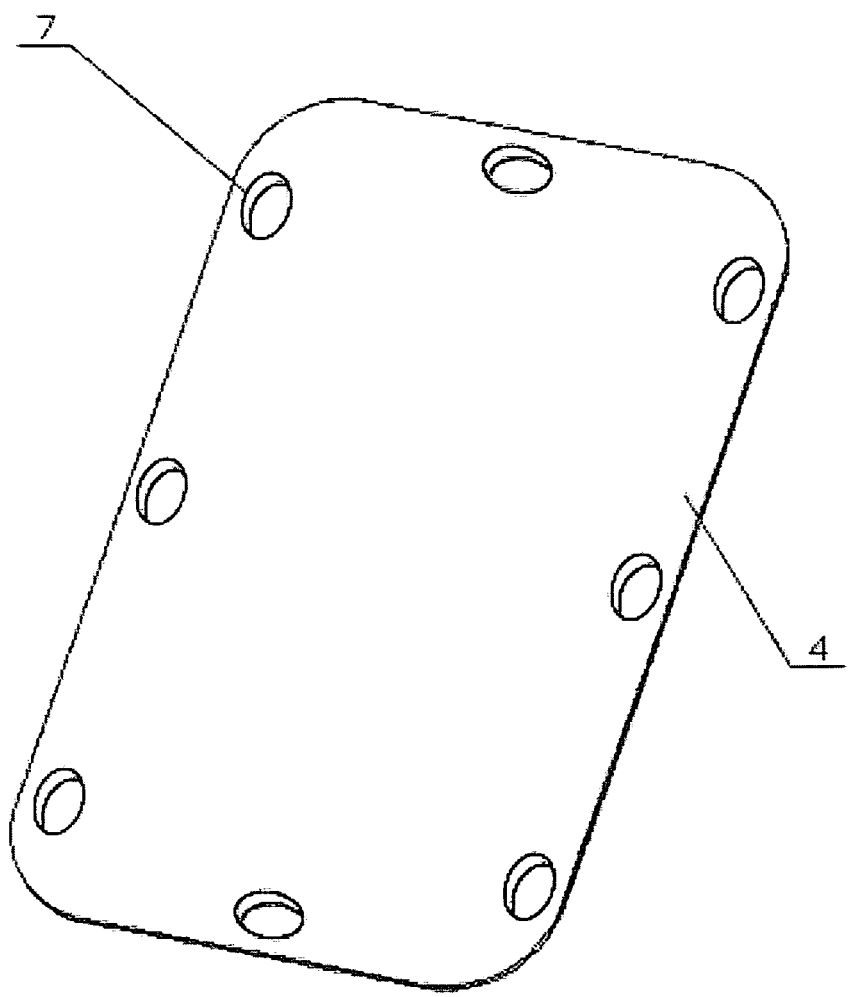

As shown in FIG. 4, FIG. 5 and FIG. 6, the decorative pattern layer 2 is shown with a fixed plate 4 that correspondent to the recess 5. The attachment of the fixed plate 4 to the correspondent recess 5 is made by a series of male connectors 6 and female connectors 7.

Figure 7:
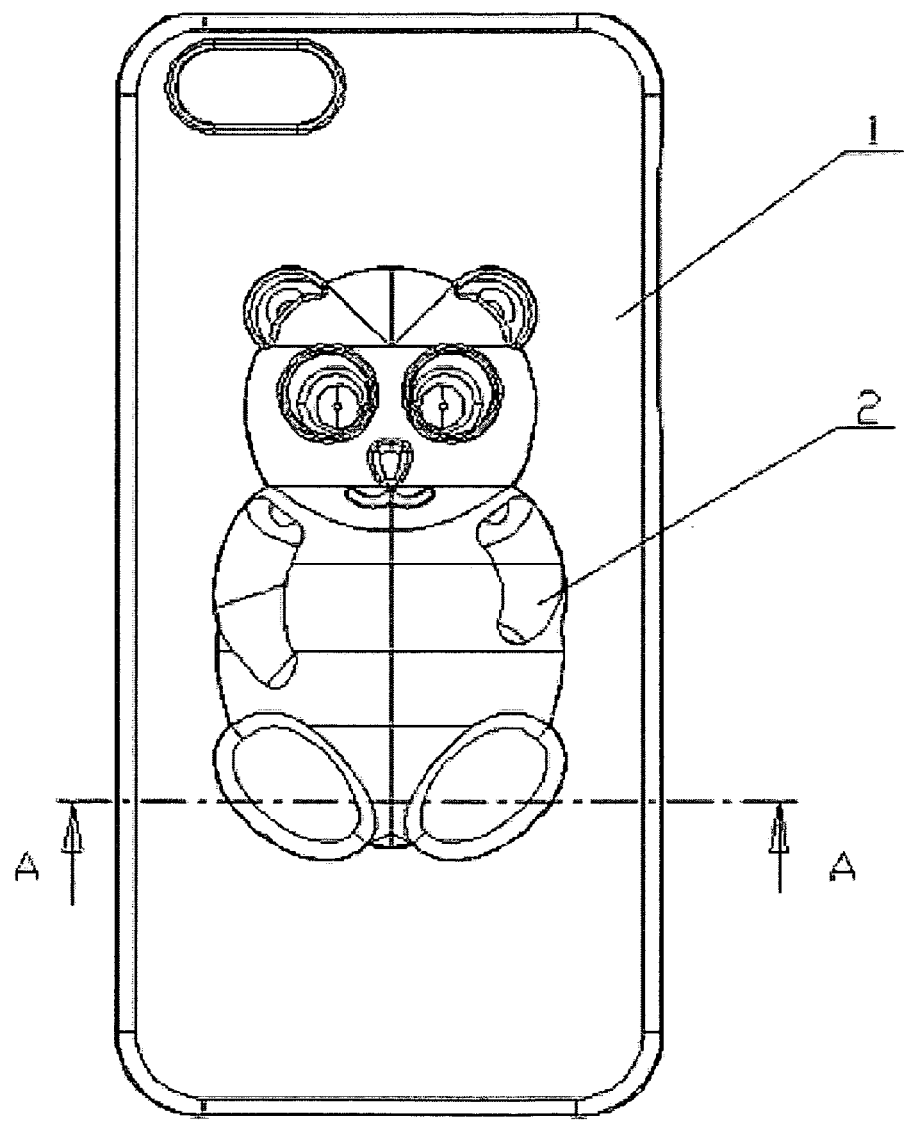

As shown in FIG. 7, the protective shell layer 1 and the decorative pattern layer 2 are well connected in place. The decorative pattern layer 2 (in this case shown as a panda design) is not only used to define the aesthetic aspect of the complete case, but it also has the function to protect the electronic device (not shown) from dust or bumps.

Figure 8:
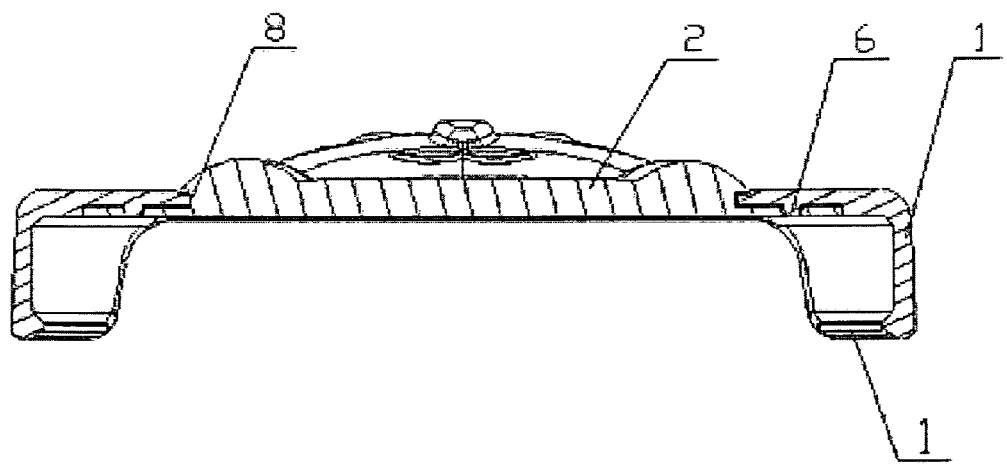

FIG. 8 shows the section A-A from FIG. 7, where it shows the decorative pattern layer 2 is set in place on the protective shell layer 1. As shown is an exemplar of a decorative pattern layer as a panda pattern design. As shown, the notch 8 is a mechanism to lock or set in place the decorative pattern layer 2 to the protective shell layer 1.

Although the detailed description of the invention has been presented in considerable detail with reference to certain preferred versions thereof, it is for illustrated and descriptive purposes only. It is not intended to limit the invention to the precise form disclosed. Other variations or forms may be possible in light of the above descriptive explanation of the invention. The embodiment was chosen and described in order to best explain the main principles of the invention and its practical application. Therefore, the spirit and scope of the appended claims should be construed to include other alternative embodiments of the invention and should not necessarily be limited to the description of the preferred version contained therein.

What is claimed is:

1. A protective case for a portable communication device, comprising a protective shell body and a decorative pattern layer, wherein the protective shell body has a pattern opening to accommodate accordingly a pattern of the decorative pattern layer, and the decorative pattern layer disposed on a fixed plate, where a fixed plate surface is larger than the pattern opening; wherein a connection between the protective shell body and the fixed plate of the decorative pattern layer is a series of male/female features.

2. The case of claim 1, wherein the protective shell body having an accommodating recess correspondent to the fixed plate of the decorative pattern layer.

3. The case of claim 2, wherein a depth of the accommodating recess is equal to the thickness of the fixed plate.

4. The case of claim 1, wherein the male/female features are an array of features around the fixed plate of the decorative pattern layer and where the male/female features having the circular shapes or any other shapes.

5. The case of claim 1, wherein the decorative pattern layer having notch between the decorative pattern layer and the fixed plate.

6. The case of claim 1, wherein the pattern of the decorative pattern layer affixing via the interior part of the pattern opening of the said protective shell body.

7. The case of claim 1, wherein the decorative pattern layer and the fixed plate are co-molded as one body.

8. The case of claim 7, wherein the decorative pattern layer and the fixed plate made with soft material.

* * * * *